A. E. NIGHTINGALE.
SEED DRILL.
APPLICATION FILED JULY 20, 1921.

1,419,296.

Patented June 13, 1922.
2 SHEETS—SHEET 1.

Inventor
A. E. Nightingale.

By
Lacey & Lacey, Attorneys

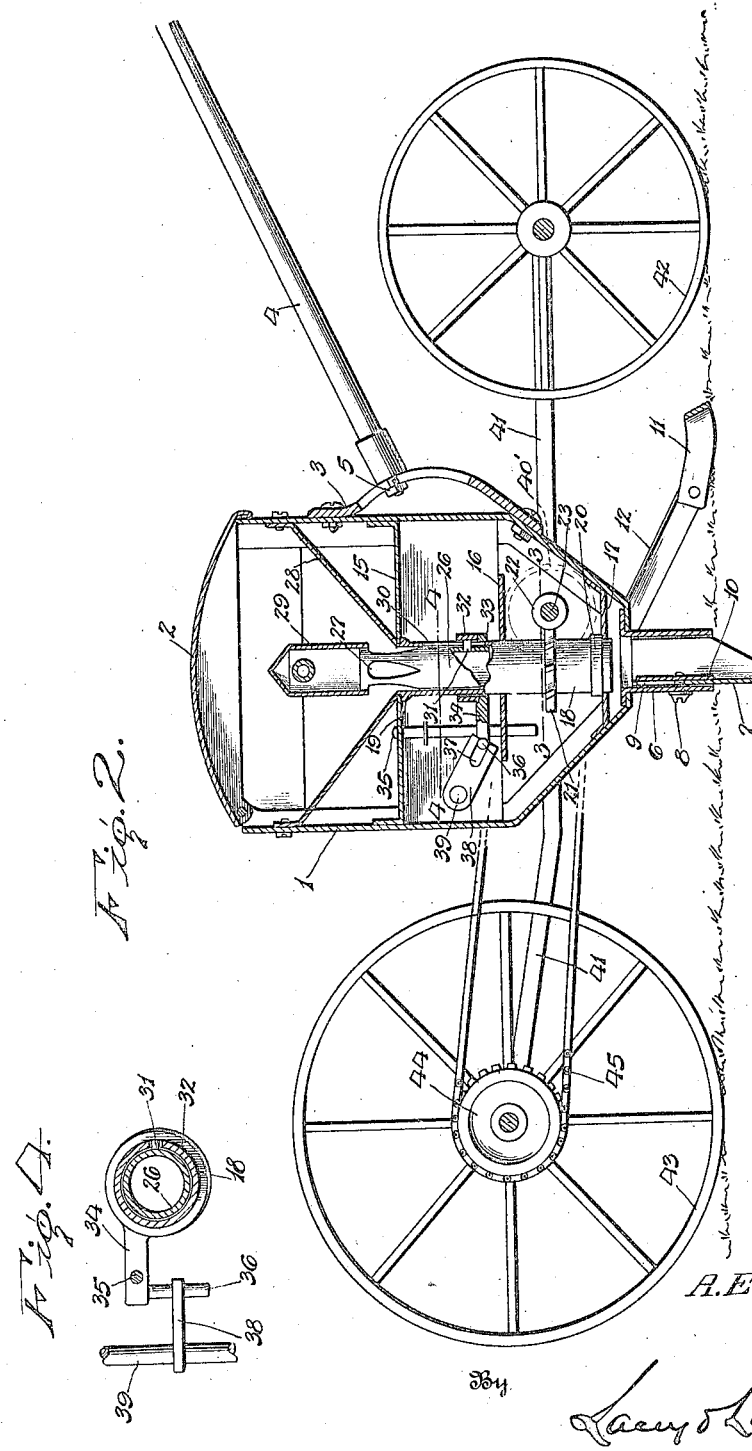

UNITED STATES PATENT OFFICE.

ALVIN E. NIGHTINGALE, OF CEDARVILLE, MASSACHUSETTS.

SEED DRILL.

1,419,296.  Specification of Letters Patent.  Patented June 13, 1922.

Application filed July 20, 1921. Serial No. 486,135.

*To all whom it may concern:*

Be it known that I, ALVIN E. NIGHTINGALE, a citizen of the United States, residing at Cedarville, in the county of Plymouth and State of Massachusetts, have invented certain new and useful Improvements in Seed Drills, of which the following is a specification.

This invention relates to seed drills and has for its object the provision of a simple and inexpensive device which may be easily operated and by which seed may be quickly planted and covered. Another object of the invention is to provide means whereby the device may be readily adapted for use in planting seeds of different sizes, and a further object of the invention is to provide means whereby the seed may be planted at different depths. Other objects will appear incidentally in the course of the following description.

In the accompanying drawings—

Fig. 2 is a view, partly in side elevation and partly in longitudinal section, of another embodiment of the invention;

Fig. 4 is a detail horizontal section taken on the line 4—4 of Fig. 2.

Figure 1:
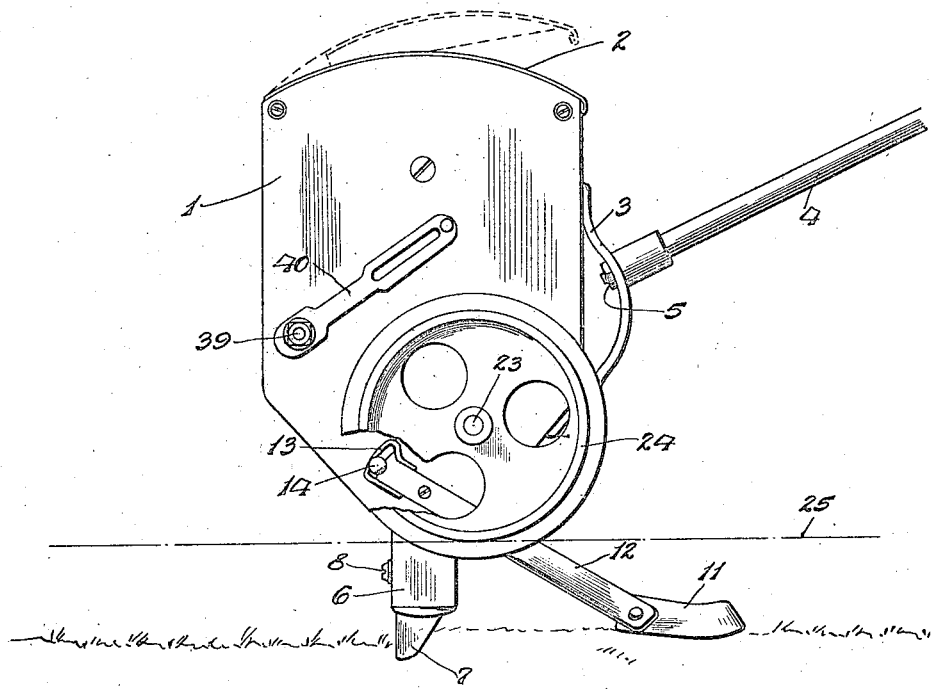
Figure 1 is a side elevation of one embodiment of my invention.

In carrying out my invention, I employ a container body 1 which is preferably flat-sided and equipped with a swinging cover 2 to facilitate the placing of the seed to be planted within the container. Upon the rear end of the container, I secure a vertically slotted bracket 3, and a handle 4 is connected to said bracket by a bolt and nut, indicated at 5, fitted through the slot of said bracket into the end of the handle so that the handle may be secured at any desired point in the height of the bracket and as the bracket is preferably of the curved formation shown the vertical adjustment of the handle will also vary the inclination of the same so that it may be very readily adjusted to the convenience of the user.

Depending from the lower end of the container is a discharge spout 6 and fitted within said spout is a furrow opener 7 which depends through the open lower end of the spout and is adjustably held therein by a set screw or bolt 8 fitted through the front wall of the spout and through a vertical slot 9 in the front wall of the furrow opener, a nut or holding plate 10 being fitted upon the inner end of the said set screw or bolt and held against turning by the engagement of its side edges with the flat sides of the furrow opener, as will be readily understood. By loosening the set screw or bolt, the furrow opener may be adjusted vertically so as to project to a greater or less extent below the spout and, therefore, form a furrow in the ground of the proper depth for the planting of the particular seed which may be within the container. I also employ an evener consisting of a bar 11 presented edgewise to the surface of the ground and carried by arms 12 which are pivotally mounted upon the sides of the container so that the evener may be adjusted pivotally and thereby set to act upon the surface of the ground and deposit the loose soil at the sides of the furrow over the planted seed. The arms 12 extend rearwardly and downwardly from the container and at the upper or front end of one of the said arms is a slotted bracket 13 through which a set screw or bolt 14 is inserted into the side wall of the container and adapted to bind against the end of the arm so as to hold the same in a set position.

Figure 3:
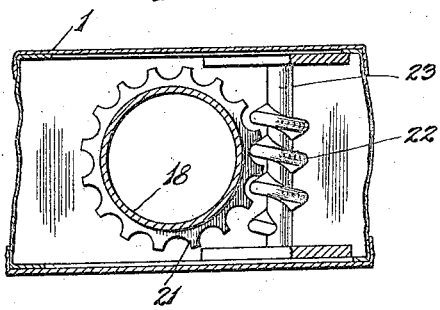
Fig. 3 is a detail horizontal section taken on the line 3—3 of Fig. 2.

Within the container are a plurality of horizontal partitions 15, 16 and 17 by which an agitating and feeding tube 18 is rotatably supported, the upper end of said tube being provided with an annular shoulder 19 abutting the under side of the partition 15 and the lower portion of said tube being provided with an annular shoulder 20 abutting the upper side of the lower partition 17 whereby vertical movement of the tube is prevented. A worm gear 21 is secured upon the tube between the partitions 16 and 17 and is engaged by a worm 22 on a shaft 23 which is journaled in the side walls of the container, as shown most clearly in Fig. 3. One end of this shaft 23 projects through the adjacent side wall of the container and is equipped with a flanged wheel 24, in the form shown in Fig. 1, which wheel is adapted to run upon a board or rail 25 placed parallel with the line of the furrow in which the seed is to be planted. The form of the invention illustrated in Fig. 1 is intended more particularly for use in small gardens and the seed-depositing mechanism is operated by the rotation of the wheel 24 due to its frictional engagement with a board or rail as indicated at 25, it being understood that any convenient board or like device is to be set on the ground and the drill is then pushed along the board with the wheel 24 resting on the board and the flange of the wheel bearing against the side or edge of the same. The device is thus easily guided and sufficient power will be developed to properly deposit the seed.

Within the seed tube 18 is telescopically fitted an inner seed tube 26 which terminates short of the lower end of the tube 18 and projects above the same, as clearly shown in Fig. 2, oval-shaped slots or openings 27 being provided in the tube adjacent the upper extremity thereof to permit the seed to pass into the tube in the operation of the device. Within the upper end of the container is a conical floor 28 secured to the sides of the container and resting upon the partition 15 at the opening therein so that seed within the container will be directed to the tubes 26 and 18. Upon the upper end of the tube 26 is a cap 29 which prevents seed passing directly into the open upper end of the tube when being poured into the container and this cap, by its rotation presently set forth, aids in agitating the seed so that they will be prevented from packing around the seed-discharging tube. A vertical slot 30 is formed in th tube 18 between the partitions 15 and 16 and a pin 31 carried by the inner tube 26 projects through the said slot so that while the inner tube may have vertical movement independent of the outer tube, the independent rotation of the tubes is prevented. A collar 32 is carried by the pin or stud 31 and encircles the outer tube 18 and is supported by a lifting ring or yoke 33 formed upon the end of a lifting bar 34 which is slidably fitted around a guide rod 35 disposed vertically between the partitions 15 and 16 and secured to the same. The outer extremity of the lifting bar 34 is provided with a lateral finger or pin 36 which engages within a notch or open-ended slot 37 in the inner end of crank 38 carried by a rock shaft 39 which is journaled in the sides of container and equipped at one end with an external handle 40. The handle 40 may be provided with any convenient or preferred means for engaging the sides of the container so as to hold it in a set position. It will be readily understood that, if the handle 40 be turned so that the crank 38 is swung upwardly, the lifter bar 34 will be raised and will carry with it the inner tube 26 so that a greater extent of the slots 27 therein will be open to the seed within the upper hopper compartment of the container and, when thus adjusted, larger seed may pass through said slots into the seed-discharging tube than will be permitted to pass when the tube is set at a lower point.

As the device is pushed over the field or along the line where seed is to be planted, the worm shaft 23 will be rotated and will act directly upon the seed-discharging tubes through the worm gear 21 so as to rotate said tubes about their vertical axes and as they rotate, the openings 27 in the upper end of the inner seed tube will act upon the seed in the container so as to partly agitate the same and effect separation so that the seed will flow readily through the openings 27 and drop through the seed tubes into the furrow formed by the opener 7. The coverer 11 will obviously follow immediately behind the discharge spout and the furrow opener so that the loose dirt turned aside by the furrow opener will be turned back over the seed.

The device may be very readily adapted for use in fields of considerable area by substituting for the flanged wheel 24 a sprocket, indicated in dotted lines at 40' in Fig. 2, the said sprocket being secured upon the worm shaft 23. Suitable supporting arms 41 are secured to the sides of the container and extend forwardly and rearwardly therefrom and in the ends of said arms are mounted ground wheels 42 and 43, the wheel 43 being preferably larger than the wheel 42 and arranged in front of the container. A sprocket 44 is disposed concentric with the wheel 43 and connected therewith so as to rotate as the said wheel rotates, and a sprocket chain 45 is trained around the said sprocket 44 and the sprocket 40 so that the motion will be communicated to the worm shaft 23. The wheels 42 and 43 serve to support the drill so that the user is not required to carry the weight of the device and is called upon merely to guide the same and hold it to a rectilinear path.

My device is obviously simple and compact in the construction and arrangement of its parts and may be readily produced at a low cost. Seed of various sizes may be readily and efficiently planted by the use of the device and it will be readily noted that the arrangement of the seed-depositing tubes is such that the seed cannot reach and settle upon any of the operating parts to clog the same.

Having thus described the invention, what is claimed as new is:

1. A seed drill comprising a container, a discharge spout depending from the lower end of the container, a seed-depositing tube disposed vertically within the container and rotatably mounted in axial alinement with the discharge spout, means in the upper end of the container for directing seed into the seed discharge tubes, and means in the lower portion of the container for rotating said tube.

2. A seed drill comprising a container, a discharge spout depending from the lower end of the container, a seed-depositing tube arranged vertically within the container in axial alinement with the discharge spout, means in the upper portion of the container for directing seed to the seed-depositing tube, a worm gear on the seed tube, a shaft rotatably mounted in the sides of the container, means for rotating said shaft, and a worm on said shaft meshing with the worm gear on the seed-depositing tube.

3. In a seed drill, the combination of a container, a vertically arranged seed tube mounted in the container and comprising an outer member and an inner member telescopically fitted within the outer member, the inner member being provided with seed openings in its upper portion, means acting on the outer member to rotate the seed tube, and means for adjusting the inner member of the seed tube vertically while constraining it to rotate with the outer member thereof.

4. In a seed drill, the combination of a container having an upper hopper compartment, a seed-depositing tube disposed vertically within the container and having its upper end provided with openings in communication with the said hopper compartment, means for vertically adjusting said seed tube whereby to expose more or less of the seed openings to the hopper compartment, and means for rotating the seed-depositing tube.

5. In a seed drill, the combination of a container having a hopper compartment in its upper end, a seed-depositing tube disposed vertically in the container and having seed openings in its upper portion, a cap secured upon the upper end of the seed-depositing tube, means for moving said tube vertically, and means for rotating said tube.

6. In a seed drill, the combination of a container having a hopper compartment in its upper end, horizontal partitions in the container below the said hopper compartment, an outer seed-depositing tube member rotatably fitted in the said partitions and held against vertical movement thereby, said tube member being provided with a vertical slot, an inner seed tube member fitted within the outer tube member, a pin projecting from the inner tube member through the slot in the outer tube member, a collar carried by said pin and encircling the outer tube member, a lifter supporting said collar, and means for moving said lifter vertically.

7. In a seed drill, the combination of a container having a hopper compartment in its upper end, horizontal partitions within the container below said hopper compartment, an outer seed tube member rotatably fitted in said partitions and held against vertical movement thereby and provided with a vertical slot, an inner tube member fitted within the outer tube member and having its upper end projected into the hopper compartment and provided with graduated seed openings, a pin projecting from the inner tube member through the slot in the outer tube member, a collar secured to the outer end of said pin and encircling the outer tube member, a vertical guide rod secured in the partitions at one side of the seed tube, a lifter slidably fitted upon said guide rod and supporting the said collar, a pin projecting laterally from the outer end of said lifter, a rock shaft journaled in the side of the container, a crank extending from said rock shaft and provided with a slot engaged by said lateral pin, and an operating handle upon the outer end of said rock shaft.

In testimony whereof I affix my signature.

ALVIN E. NIGHTINGALE. [L.S.]